United States Patent [19]

Barri

[11] Patent Number: 4,975,258
[45] Date of Patent: Dec. 4, 1990

[54] NOVEL CRYSTALLINE (METALLO) SILICATES AND GERMANATES

[75] Inventor: Sami I. Barri, Berkshire, England

[73] Assignee: The British Petroleum Company, p.l.c., London, England

[21] Appl. No.: 386,397

[22] Filed: Jul. 27, 1989

[30] Foreign Application Priority Data

Aug. 3, 1988 [GB] United Kingdom ............... 8818452

[51] Int. Cl.⁵ .................... C01B 35/12; C01B 33/20; C01B 33/28
[52] U.S. Cl. .................................... 423/279; 423/277; 423/326; 423/328; 423/593; 423/594; 423/598; 423/600; 502/61; 502/64
[58] Field of Search ............... 423/328, 329, 330, 277, 423/326, 593, 594, 598, 600; 502/61, 64

[56]         References Cited
        U.S. PATENT DOCUMENTS

| | | | |
|---|---|---|---|
| 3,702,886 | 11/1972 | Argauer et al. | 423/328 |
| 3,972,983 | 11/1974 | Ciric | 423/128 |
| 4,372,930 | 5/1981 | Short et al. | 423/326 |
| 4,508,837 | 9/1982 | Zones | 502/62 |
| 4,510,256 | 5/1983 | Zones | 502/62 |
| 4,581,216 | 4/1986 | Iwayama et al. | 423/328 |
| 4,619,820 | 10/1986 | Valyocsik | 423/328 |

FOREIGN PATENT DOCUMENTS

| | | | |
|---|---|---|---|
| 51318 | 5/1982 | European Pat. Off. | 423/328 |
| 91049 | 10/1983 | European Pat. Off. | |
| 207184 | 2/1984 | Fed. Rep. of Germany | 423/328 |
| 1334243 | 10/1973 | United Kingdom | 423/328 |

Primary Examiner—John Doll
Assistant Examiner—R. Bruce Breneman
Attorney, Agent, or Firm—Larry W. Evans; Joseph G. Curatolo; Sue E. Phillips

[57]            ABSTRACT

A crystalline material having, in the dehydrated form, the empirical formula:

$$m(m_{2/a}O):X_zO_{xz/2}:yYO_2 \qquad (I)$$

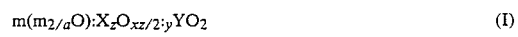

in which m is 0.5 to 1.5; M is a cation of valency a; X is a metal of valency x, selected from aluminum, boron, gallium, zinc, iron and titanium; z is 2 when x is an odd number, and z is 1 when x is an even number; y is at least 5; and Y is silicon or germanium; and having, in the calcined hydrogen form, an X-ray diffraction pattern including significant peaks substantially as shown in Table I herein. The material has been designated SUZ-2.

8 Claims, No Drawings

NOVEL CRYSTALLINE (METALLO) SILICATES AND GERMANATES

The present invention relates to novel crystalline silicates, germanates, metallosilicates and metallogermanates, and to a process for their preparation.

The present invention provides a crystalline material having, in the dehydrated form, the empirical formula:

$$m(M_{2/a}O): X_zO_{xz/2}: yYO_2 \quad (I)$$

in which m is 0.5 to 1.5; M is a cation of valency a; X is a metal of valency x, selected from aluminium, boron, gallium, zinc, iron and titanium; z is 2 when x is an odd number, and z is 1 when x is an even number; y is at least 5; and Y is silicon or germanium; and having, in the calcined hydrogen form, an X-ray diffraction pattern including significant peaks substantially as shown in Table I herein.

The material according to the invention is referred to herein as SUZ-2. The material can be regarded as a metallosilicate or metallogermanate, or as a silicate or germanate when y is very high.

Preferably X is gallium or, especially, aluminium. Preferably Y is silicon. The material may contain two or more different metals X, and/or both silicon and germanium. When X is aluminium and Y is silicon, the material is an aluminosilicate, or zeolite.

As is common in this field, it should be understood that in addition to the elements represented in the general formula I, the material may be hydrated by water in addition to any present when M is hydrogen. The material may also include occluded or adsorbed materials such as alcohols or nitrogenous materials originally present in the synthesis mixture or resulting from reaction of materials originally present. Further, the material may contain more cations M than necessary to balance the charge associated with metal X. This phenomenon is described, for example, in J. Chem. Soc. Chem. Commun., 1985, pp. 289-290. All such materials should be understood to be within the scope of the invention.

The cation M may for example be selected from $H^+$, ammonium, alkali metal cations, alkaline earth metal cations, organic nitrogen containing cations, aluminium cations, gallium cations and mixtures thereof. The cations M present in the material as initially prepared will of course depend on the substances present in the synthesis gel. Commonly, an alkali metal, especially sodium and/or potassium will be present, possibly along with cations of organic nitrogen-containing materials. Those cations initially present may if desired be replaced either wholly or partially by other cations e.g. hydrogen ions or metal cations using conventional ion exchange techniques. The hydrogen form (i.e. $M=H^+$) may be produced by known methods such as acid exchange or ammonium exchange followed by a thermal treatment, or a combination of the two. For many applications, it may be useful to produce SUZ-2 in the calcined hydrogen form.

Occluded or adsorbed materials may if desired be removed by thermal and/or chemical techniques.

As stated above, material SUZ-2 may be prepared by reacting together under aqueous alkaline conditions the following materials: a source of oxide $YO_2$; water; quinuclidine or its precursor or reaction product; and tetraethylammonium hydroxide or halide or its precursor or reaction product; plus if desired, a source of oxide $X_zO_{xz/2}$ and a source of $M(OH)_a$; the reaction conditions being selected and maintained such as to produce crystals of SUZ-2. Preferably the reaction mixture has components in the following molar ratios: $YO_2/X_zO_{xz/2}$ = at least 10, e.g. 10 to 80, especially 20 to 60, most preferably 25 to 45; quinuclidine or derivative/tetraethylammonium compound = 0.1 to 3.0, especially 0.5 to 2.0, most preferably 0.6 to 1.5; $H_2O/YO_2$ = 4 to 500, especially 5 to 200, most preferably 7 to 50; $OH^-/H_2O$ = less than 0.04, especially less than 0.02, most preferably $10^{-4}$ to 0.01; quinuclidine or derivative plus tetraethylammonium compound/$YO_2$ = 0.01 to 2.0, especially 0.01 to 1.0, most preferably 0.1 to 0.5. $OH^-$ should be understood to be defined as follows:

a[no. of moles of $M(OH)_a$]-(no. of moles of $M(OH)_a$ associated with $X_zO_{xz/2}$)]

It should be understood that even if no source of oxide $X_zO_{xz/2}$ or source of $M(OH)_a$ is deliberately added to the reaction mixture, the resulting material will inevitably contain small amounts of element X or metal cations M, particularly aluminium and sodium, present as impurities in the reactants or as contaminants of the equipment used.

Following synthesis, it is possible to adjust the value of y by conventional chemical techniques. For example, y may be increased by treatment with acid, silicon tetrachloride, ammonium hexafluorosilicate or a combination of steaming and ammonium ion exchange. All these treatments tend to remove element X from the framework. y may be reduced by treatment with, for example, sodium aluminate, gallate, zincate or titanate, or similar treatments which introduce X into the framework.

The source of oxide $YO_2$ may for example be sodium silicate, silicic acid, precipitated silica, colloidal silica, or the germanium equivalent.

The source of oxide $X_zO_{xz/2}$, if used, may be an aluminium salt, aluminium hydroxide, aluminium oxide, or a metal aluminate; or the equivalent for other metals X. The use of a metal aluminate, especially sodium aluminate, is preferred.

The source of $M(OH)_a$ may for example be an alkali or alkaline earth metal hydroxide, for example sodium, potassium, magnesium or calcium hydroxide. A mixture of different materials, for example sodium hydroxide plus potassium hydroxide, may be used.

The reaction mixture may also if desired contain an alcohol, for example methanol. If alcohol is present, then the molar ratio is preferably alcohol/$YO_2$ = up to 200, especially up to 100, most preferably up to 50.

The reaction mixture is maintained under crystallisation conditions until crystals of the desired product SUZ-2 are formed. In general a reaction temperature of from 100° to 250° C. under autogenous pressure is suitable, and an optimum reaction time can be determined by monitoring the course of the reaction.

It has been found that the material SUZ-2 as prepared contains relatively large amounts of nitrogenous material, probably quinuclidine or a reaction product thereof, occluded within its pores. Other materials which may be present include tetraethylammonium hydroxide, or reaction products thereof.

As is common in zeolite synthesis, the precise way in which the reaction is carried out will affect the end product. Particular combinations of parameters may be used to optimise the yield of SUZ-2. Such optimisation is a routine part of zeolite synthesis. The novel product SUZ-2 may under some circumstances be co-produced with other crystalline materials. It is for example often produced in admixture with mordenite. The alkalinity of the reaction mixture may be a particularly important parameter; for a mixture having a fixed Si/Al ratio, a higher alkalinity appears to lead to a product having a lower Si/Al ratio. The Si/Al ratio of the product will in any event be lower than or equal to the Si/Al ratio of the reaction mixture. Particular reaction conditions which lead to the production of SUZ-2 are given in the Examples herein.

Material SUZ-2 has a variety of potential applications particularly as a catalyst or adsorbent. As is common in the field of zeolites and zeolite-type materials, it may be used in a number of purifications or separations, and a number of catalytic conversions, for example the conversion of hydrocarbons and oxygenates into other products. In addition to its intrinsic activity conferred by its porous crystalline structure, it may also be subjected to exchange or impregnation with an element suitable for imparting a specific type of catalytic activity. Metal or non-metal compounds which may be used for ion-exchange and/or impregnation may for example be compounds of any one of the following elements, namely those belonging to Groups IB, IIA, IIB, IIIA, IIIB, IVA, IVB, VA, VIB, VIIB and VIII according to the Periodic Table due to Mendeleef. Specifically, compounds of copper, silver, zinc, aluminium, gallium, indium, thallium, lead, antimony, bismuth, chromium, molybdenum, tungsten, manganese, iron, cobalt, nickel, ruthenium, rhodium, palladium, iridium, platinum, rhenium and phosphorus are preferred.

Throughout this Specification, it should be understood that reference to an X-ray diffraction pattern indicates a powder diffraction pattern obtained on a conventional fixed-slit X-ray diffractometer using copper K-alpha radiation. Table I gives the positions of significant peaks present in the XRD of fully calcined SUZ-2 in the hydrogen form. It should be understood that the complete XRD's may contain peaks in addition to those listed in the Table. In addition, where peaks are close together, two or more peaks may, through lack of resolution, appear as a single peak. For example, the peaks at 7.1 and 7.0 in Table I may appear as a single peak. XRD's are of course obtained from experimental samples. Where a material is produced in admixture with another material, unknown peaks resulting from the first material may be hidden underneath peaks at the same position attributable to the second material. It will also be understood that the intensities of the peaks can vary widely depending on a number of factors, notably the presence of non-framework materials. The presence of water, alcohol or nitrogenous materials present in or resulting from the original synthesis gel, may alter the relative intensities of the peaks at different d-spacings. Other factors which can affect the details of the XRD include the molar ratio of X to Y and the particle size and morphology of the sample. It will be appreciated that the XRD patterns presented in the Examples hereinafter are those actually obtained from various samples of calcined and uncalcined SUZ-2. Data were collected on a Philips PW 1050 goniometer fitted with a fixed divergence slit (¼ degree) in the incident beam and a graphite monochromator in the diffracted beam. Theta is the Bragg angle; I is the intensity of a peak; and $I_o$ is the intensity of the strongest peak. Philips APD 1700 processing software was used to determine d-spacings (in angstrom units) and relative intensities ($100 \times I/I_o$) with copper radiation, copper K-alpha one wavelength = 1.54056 Angstroms.

The following Examples illustrate the invention. In the Examples, the following reagents were used:
Sodium aluminate: ex. BDH technical containing 40 wt% $Al_2O_3$, 30 wt% $Na_2O$ and 30 wt% $H_2O$
Potassium hydroxide: ex. FSA Laboratory Supplies
Distilled water
Quinuclidine ex Aldrich
Tetraethylammonium hydroxide solution: ex Fluka AG 40 wt% in water
Ludox AS40 (Trade Mark): ex DuPont containing 40 wt% silica in $H_2O$ The quantities of reagents used in each synthesis Example are summarised in Table A.

The following abbreviations are used:
WHSV: weight of feed per weight of catalyst per hour;
GHSV: volume of gas per volume of catalyst per hour; and
LHSV: volume of liquid per volume of catalyst per hour.

EXAMPLE 1

2.5 g of sodium aluminate and 1.5 g of potassium hydroxide were dissolved in 25 grams of distilled water. 5 g of quinuclidine and 15 g of tetraethylammonium hydroxide solution (40 wt% in water) were added to the solution and stirring was carried out for approximately five minutes. 50 g of Ludox AS40 (Trade Mark) was added with stirring. The formed hydrogel was stirred in order to ensure homogenous mixture. The hydrogel had a molar composition of:

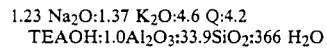

where
Q = quinuclidine
TEAOH = tetraethylammonium hydroxide

The hydrogel was loaded into approximately 150 cm³ pressure vessel and heated at 180° C. while revolving for 6 days under its autogeneous pressure. At the end of this period the pressure vessel was cooled to ambient and the content was filtered. The solid product was washed with distilled water and dried at 100° C. The dried solid was examined by X-ray diffraction: the X-ray diffraction pattern is shown in Table 1. The product, SUZ-2 in admixture with mordenite, was analysed by X-ray fluorescence spectroscopy and found to have a Si/Al ratio of 14.4.

EXAMPLE 2

The procedure of Example 1 was essentially followed to make the hydrogel except that the reagents and weights used are those shown in Table A. The hydrogel had a molar composition of:

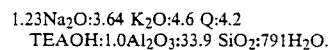

The solid product after filtering, washing and drying (as per Example 1) was found by XRD to have a diffraction pattern as shown in Table 2, indicating SUZ-2 in admixture with mordenite.

The product was analysed by X-ray fluorescence spectroscopy and found to have a Si/Al atomic ratio of 12.2.

EXAMPLE 3(a)

The procedure of Example 1 was essentially followed to make the hydrogel except that the reagents and weights used are those shown in Table A. The hydrogel had a molar composition of:

1.23$Na_2O$:3.03$K_2O$:3.8Q:4.4 TEAOH:1.0$Al_2O_3$:28.3$SiO_2$:671$H_2O$.

The hydrogel was heated at 180° C. for 7 days. The solid product, SUZ-2 with some mordenite present, after filtering, washing and drying was found by XRD to have a diffraction pattern as shown in Table 3(a). It was found by X-ray fluorescence spectroscopy to have a Si/Al atomic ratio of 10.6.

EXAMPLE 3(b)

Approximately 5 grams of the product of Example 3(a) were placed as a shallow bed in a silica tray (dimensions 156×95×24mm). The tray was placed in a muffle furnace and heated at 1° C./minute to 550° C. and held at this temperature for 24 hours. A nominal air flow of not less than 500cm³/minute was passes through the furnace throughout.

The furnace was allowed to cool after the heating period and the sample was $NH_4^+$ exchanged twice at room temperature by stirring the zeolite in 250 grams of 1M $NH_4NO_3$ solution for 30 minutes.

The zeolite was then washed and dried and finally calcined at 550° C. as above, to produce the zeolite in its fully calcined hydrogen form. The powder pattern of the product was as shown in Table 3(b).

EXAMPLE 4

1.3 g of sodium aluminate and 2.0 g of potassium hydroxide were dissolved in 50.0 g of distilled water. 8.3 g of tetraethylammonium hydroxide solution (40 wt% in water) and 2.5 g of quinuclidine were added to the solution and stirred for approximately 5 minutes. 24.7 of Ludox AS40 was added with stirring in order to ensure that the formed hydrogel was homogenously mixed. The hydrogel had a molar composition of: 1.2 $Na_2O$:3.5 $K_2O$:4.4 Q:4.4 TEAOH: 1.0 $Al_2O_3$:33.3 $SiO_2$:761 $H_2O$.

The hydrogel was loaded into approximately 150 cm³ pressure vessel and heated to 175° C. while revolving for 6 days. At the end of this period the pressure vessel was cooled to ambient and the content was filtered. The solid product was washed with distilled water, dried at 100° C. and examined by X-ray powder diffraction. The XRD pattern is shown in Table 4. The product was SUZ-2 zeolite and small amounts of mordenite and unidentified material.

EXAMPLE 5(a)

1.5 g of sodium aluminate and 1.3 g of potassium hydroxide were dissolved in 49.7 g of distilled water. 10.1 g of tetraethylammonium hydroxide solution (40 wt% in water) and 2.5 g of quinuclidine were added to the solution and stirred for approximately 5 minutes. 24.9 g of Ludox AS40 was added with stirring in order to ensure that the formed hydrogel was homogenously mixed. The hydrogel had a molar composition of: 1.2 $Na_2O$:1.9 $K_2O$:3.8 Q:4.7 TEAOH:1.0 $Al_2O_3$: 28.1 $Si_2$:668 $H_2O$.

The hydrogel was loaded into approximately 150 cm³ presure vessel and heated to 166° C. while revolving for 6 days. At the end of this period the pressure vessel was cooled to ambient and the content was filtered. The solid product was washed with distilled water and dried at 100° C. A sample of the product was calcined at 550° C. for 16 hours and then examined by X-ray powder diffraction. The XRD pattern is given in Table 5(a). The product was SUZ-2 zeolite and a small amount of mordenite.

EXAMPLE 5(b)

The calcined sample (0.5 g) from Example 5(a) was ion exchanged in 50 cm³ of 10 wt % nitric acid solution for 4 hours at room temperature. The sample was filtered, washed with distilled water, dried at 100° C., calcined at 550° C. for 16 hours and examined by X-ray powder diffraction. The XRD pattern is given in Table 5(b). The $SiO_2/Al_2O_3$ molar ratio of the product was found to be 25.0 by X-ray fluorescence spectroscopy.

EXAMPLE 6

1.5 g of sodium aluminate and 1.3 g of potassium hydroxide were dissolved in 45.0 g of distilled water. 10.1 g of tetraethylammonium hydroxide solution (40 wt % in water) and 2.5 g of quinuclidine were added to the solution and stirred for approximately 5 minutes. 30.1 g of Ludox AS40 was added with stirring in order to ensure that the formed hydrogel was homogenously mixed. The hydrogel had a molar composition of: 1.2 $Na_2O$:2.0 :$K_2O$:3.8 Q:4.6 TEAOH:1.0 $Al_2O_3$:33.8 $SiO_2$:652 $H_2O$.

The hydrogel was loaded into approximately 150 cm³ pressure vessel and heated to 166° C. while revolving for 6 days. At the end of this period the pressure vessel was cooled to ambient and the content was filtered. The solid product was washed with distilled water, dried at 100° C. and examined by X-ray powder diffraction. The XRD pattern is shown in Table 6. The product was SUZ-2 zeolite and small amounts of mordenite and quartz.

EXAMPLE 7

5.0 g of sodium aluminate and 7.9 g of potassium hydroxide were dissolved in 200 g of distilled water. 33.4 g of tetraethylammonium hydroxide solution (40 wt % in water) and 10.0 g of quinuclidine were added to the solution and stirred for approximately 5 minutes. 99.8 g of Ludox AS40 was added with stirring in order to ensure that the formed hydrogel was homogenously mixed. The hydrogel had a molar composition of: 1.2 $Na_2O$:3.6 $K_2O$:4.6 TEAOH:1.0 $Al_2O_3$:33.9 $SiO_2$:793 $H_2O$.

A quarter of the hydrogel was loaded into approximately 150 cm³ pressure vessel and heated to 180° C. while revolving for 7 days. At the end of this period the pressure vessel was cooled to ambient and the content was filtered. The solid product was washed with distilled water and dried at 100° C. Examination by X-ray powder diffraction showed that the product was SUZ-2 and a small amount of mordenite. 9 g of the product was refluxed in 1.5 liters of 3 wt % nitric acid solution for 1 hour. The zeolite was filtered, washed and the reflux treatment was repeated. After the second 1 hour reflux the mixture was left standing at room temperature for 2 days. The zeolite was filtered and washed well with distilled water, dried at 100° C. and calcined in nitrogen at 450° C. for 16 hours. The zeolite was then given 2 1-hour reflux treatments in 1.5 liters 70 wt % nitric acid and 2 1-hour reflux treatments in 1.5 liters 0.6 wt % nitric acid. The sample was finally filtered, washed well with distilled water, dried at 100° C. and calcined in air at 450° C. for 16 hours. The sample was examined by X-ray powder diffraction. The XRD pattern is given in Table 7. The $SiO_2/Al_2O_3$ molar ratio was found by X-ray fluorescence spectroscopy to be 40.

EXAMPLE 8

The zeolite sample produced from Example 7 was tested for adsorption and found to adsorb 60 mg/g n-butane at 25° C. and $p/p_o=0.2$ and 75 mg/g toluene at 25° C. and $p/p_o=0.2$.

EXAMPLE 9

The zeolite powder from Example 7 was pressed into a tablet at 7 tons per square inch of pressure. The tablet was crushed and sieved to pass through 500 micron but not 250 micron sieves. 4.3 cm$^3$ of this catalyst was loaded into a reactor and activated as follows: the temperature of the catalyst was raised by 10° C./minute until it plateaued at 500° C. which was sustained for 3 hours and then the reactor was cooled to 300° C. A flow of hydrogen (75 cm$^3$/minute) was maintained throughout this treatment. The catalyst was tested for the conversion of a liquid feed consisting of a 2:1 (by volume) mixture of hexadecane and dodecene at 300° C., LHSV of 1.5 and pressure of 20 barg. A gas flow consisting of 2:1 hydrogen and carbon monoxide was cofed with the liquid feed at GHSV of 1248. After 1 hour on stream the conversion of the dodecene was 100% and the conversion of the hexadecane was 82.9 molar %. The carbon molar selectivity to products with carbon number between 5 and 11 was 77.5%.

EXAMPLE 10

After the test described in Example 9, the catalyst was regenerated in air at 550° C. and tested for the synthesis of acrylic acid from formaldehyde and acetic acid. A feed of acetic acid and formaldehyde (3:1 molar) was passed over the catalyst at atmospheric pressure, 390° C. and WHSV of 2. After 0.5 hour on stream the molar yield of the acrylic acid, based on formaldehyde, was 23%.

EXAMPLE 11

After the test described in Example 10, the catalyst was regenerated in air at 550° C. and tested for the conversion of methanol. The methanol feed was passed over the catalyst at atmospheric pressure, 400° C. and WHSV of 2.4. After 1 hour on stream the methanol molar conversion was 91.8% and the molar selectivities to the hydrocarbons with carbon number between 2 and 4 was 60.3% (consisted mainly of ethene, propene and butenes) and to hydrocarbons with carbon number equal to and greater than 5 was 22.5%.

EXAMPLE 12

After the test described in Example 11, the catalyst was activated in air at 550° C. and tested for the alkylation of toluene with methanol. A 2:1 molar mixture of toluene and methanol was passed over the catalyst at atomspheric pressure, 500° C. and LHSV of 2. After 1 hour on stream the organic product contained at least 16% of mainly xylenes and higher substituted benzene.

EXAMPLE 13

After the test described in Example 12, the catalyst was activated in air at 550° C. and tested for the conversion of butenes at 300° C., atmospheric pressure and WHSV of 5. After 1 hour on stream the conversion of the butenes was 74 wt % and the selectivities to hydrocarbons with carbon numbers equal to and greater than 5 was 96 wt %.

TABLE A

Reagents and Weights used in Examples

| Reagent | Weight in Grams Example | | | | | | |
|---|---|---|---|---|---|---|---|
| | 1 | 2 | 3a | 4 | 5a | 6 | 7 |
| Sodium aluminate | 2.5 | 1.25 | 1.5 | 1.3 | 1.5 | 1.5 | 5.0 |
| Potassium hydroxide | 1.5 | 2.0 | 2.0 | 2.0 | 1.3 | 1.3 | 7.9 |
| Distilled water | 25 | 50 | 50 | 50 | 49.7 | 45.0 | 200 |
| Quinuclidine | 5 | 2.5 | 2.5 | 2.5 | 2.5 | 2.5 | 10.0 |
| Tetraethylammonium hydroxide (40% w/w in water) | 15 | 7.5 | 9.5 | 8.3 | 10.1 | 10.1 | 33.4 |
| Ludox AS40 | 50 | 25 | 25 | 24.7 | 24.9 | 30.1 | 99.8 |

TABLE I

Significant Peaks included in the XRD of SUZ-2, calcined, hydrogen form

| d(Å) | I |
|---|---|
| 11.4 ± 0.3 | S |
| 9.5 ± 0.3 | S |
| 7.1 ± 0.2 | W/M |
| 7.0 ± 0.2 | S |
| 5.8 ± 0.15 | M |
| 5.4 ± 0.15 | S |
| 4.8 ± 0.1 | M |
| 4.0 ± 0.1 | M/S |
| 3.8 ± 0.1 | VS |
| 3.6 ± 0.1 | S |
| 3.5 ± 0.1 | M |
| 3.1 ± 0.1 | S |
| 3.05 ± 0.1 | W |

VS = 60–140
S = 40–60
M = 20–40
W = 0–20

TABLE 1

XRD of product obtained in Example 1

| 2 theta | d(Å) | $I/I_o$ |
|---|---|---|
| 6.46 | 13.67 | 26* |
| 7.71 | 11.46 | 28 |
| 8.57 | 10.31 | 8* |
| 9.29 | 9.51 | 30 |
| 9.73 | 9.08 | 45* |
| 12.67 | 6.98 | 23 |
| 13.44 | 6.58 | 37* |
| 13.86 | 6.38 | 6* |
| 14.58 | 6.07 | 7* |
| 15.26 | 5.80 | 29* |
| 15.58 | 5.68 | 14 |
| 16.26 | 5.45 | 30 |
| 17.68 | 5.01 | 7 |
| 18.36 | 4.83 | 15 |
| 19.61 | 4.52 | 30* |
| 20.99 | 4.23 | 3 |
| 21.36 | 4.16 | 5 |
| 22.24 | 3.99 | 53* |
| 23.06 | 3.85 | 37 |
| 23.38 | 3.80 | 67 |
| 23.72 | 3.75 | 21* |
| 24.40 | 3.65 | 17 |
| 24.90 | 3.57 | 42 |
| 25.61 | 3.48 | 100* |
| 26.29 | 3.39 | 39* |
| 27.64 | 3.22 | 42* |
| 28.35 | 3.15 | 36 |
| 29.21 | 3.05 | 13 |
| 30.13 | 2.96 | 8 |
| 30.93 | 2.89 | 16* |

TABLE 1-continued

XRD of product obtained in Example 1

| 2 theta | d(Å) | I/I$_o$ |
|---|---|---|
| 31.64 | 2.83 | 4 |

TABLE 2

XRD of product as produced in Example 2

| 2 theta | d(Å) | I/I$_o$ |
|---|---|---|
| 6.45 | 13.69 | 18* |
| 7.72 | 11.44 | 42 |
| 8.58 | 10.30 | 6* |
| 9.31 | 9.49 | 42 |
| 9.72 | 9.09 | 29* |
| 12.31 | 7.18 | 17 |
| 12.66 | 6.99 | 35 |
| 13.42 | 6.59 | 25* |
| 13.87 | 6.38 | 3* |
| 14.57 | 6.07 | 4* |
| 15.30 | 5.79 | 35* |
| 15.56 | 5.69 | 15 |
| 16.27 | 5.44 | 47 |
| 17.75 | 4.99 | 9 |
| 18.37 | 4.83 | 20 |
| 18.77 | 4.72 | 9 |
| 19.17 | 4.63 | 9 |
| 19.60 | 4.53 | 21* |
| 21.38 | 4.15 | 3 |
| 22.21 | 4.00 | 43* |
| 23.08 | 3.85 | 46 |
| 23.39 | 3.80 | 86 |
| 23.72 | 3.75 | 17* |
| 24.34 | 3.65 | 16 |
| 24.90 | 3.57 | 54 |
| 25.55 | 3.48 | 100* |
| 26.28 | 3.39 | 25* |
| 26.68 | 3.34 | 9 |
| 27.63 | 3.23 | 26* |
| 28.37 | 3.14 | 50 |
| 29.20 | 3.06 | 18 |
| 30.16 | 2.96 | 9 |
| 30.94 | 2.89 | 11* |
| 31.66 | 2.82 | 5 |

*Lines partly or wholly due to mordenite

TABLE 3(a)

XRD of product as prepared in Example 3(a)

| 2 theta | d(Å) | I/I$_o$ |
|---|---|---|
| 6.43 | 13.70 | 21* |
| 7.70 | 11.50 | 52 |
| 8.55 | 10.30 | 6* |
| 9.29 | 9.51 | 47 |
| 9.71 | 9.10 | 25* |
| 12.31 | 7.18 | 18 |
| 12.65 | 6.99 | 36 |
| 13.41 | 6.60 | 23* |
| 13.82 | 6.40 | 4* |
| 14.54 | 6.09 | 4* |
| 15.31 | 5.78 | 38* |
| 16.26 | 5.45 | 48 |
| 17.73 | 5.00 | 9 |
| 18.34 | 4.83 | 20 |
| 18.76 | 4.73 | 9 |
| 19.14 | 4.63 | 8 |
| 19.58 | 4.53 | 17* |
| 21.38 | 4.15 | 3 |
| 22.19 | 4.00 | 41* |
| 22.52 | 3.94 | 8 |
| 23.07 | 3.85 | 51 |
| 23.37 | 3.80 | 89 |
| 23.72 | 3.75 | 13* |
| 24.33 | 3.66 | 15 |
| 24.88 | 3.58 | 54 |
| 25.56 | 3.48 | 100 |
| 26.25 | 3.39 | 20* |
| 26.65 | 3.34 | 7 |
| 27.66 | 3.22 | 23 |
| 28.36 | 3.14 | 52 |

TABLE 3(a)-continued

XRD of product as prepared in Example 3(a)

| 2 theta | d(Å) | I/I$_o$ |
|---|---|---|
| 29.17 | 3.06 | 19 |
| 30.15 | 2.96 | 9 |
| 30.91 | 2.89 | 10* |
| 31.62 | 2.83 | 5 |

*Lines partly or wholly due to mordenite

TABLE 3(b)

XRD of product, calcined, as obtained in Example 3(b)

| 2 theta | d(Å) | I/I$_o$ |
|---|---|---|
| 6.47 | 13.65 | 7* |
| 7.65 | 11.38 | 63 |
| 8.65 | 10.21 | 12* |
| 9.34 | 9.46 | 69 |
| 9.71 | 9.10 | 33* |
| 12.40 | 7.13 | 32 |
| 12.74 | 6.94 | 53 |
| 13.48 | 6.56 | 24* |
| 13.92 | 6.36 | 3* |
| 14.66 | 6.04 | 4* |
| 15.21 | 5.82 | 21* |
| 15.37 | 5.76 | 28 |
| 15.60 | 5.68 | 18 |
| 16.33 | 5.42 | 33 |
| 17.88 | 4.96 | 2 |
| 18.41 | 4.81 | 21 |
| 18.81 | 4.71 | 8 |
| 19.27 | 4.60 | 7 |
| 19.63 | 4.52 | 16* |
| 22.33 | 3.98 | 35* |
| 22.61 | 3.93 | 10 |
| 23.13 | 3.84 | 43 |
| 23.47 | 3.79 | 86 |
| 23.82 | 3.73 | 15* |
| 24.39 | 3.65 | 14 |
| 25.03 | 3.56 | 51 |
| 25.68 | 3.47 | 100* |
| 26.36 | 3.38 | 27* |
| 26.78 | 3.33 | 10 |
| 27.61 | 3.23 | 22* |
| 27.86 | 3.20 | 14 |
| 28.48 | 3.13 | 48 |
| 29.28 | 3.05 | 20 |
| 30.24 | 2.95 | 9 |
| 30.97 | 2.89 | 11* |
| 31.80 | 2.81 | 5 |

*Lines partly or wholly due to mordenite

TABLE 4

XRD of product as produced in Example 4

| 2 theta | d(Å) | I/I$_o$ |
|---|---|---|
| 6.55 | 13.48 | 8* |
| 7.78 | 11.35 | 53 |
| 8.70 | 10.15 | 13* |
| 9.38 | 9.43 | 58 |
| 9.79 | 9.03 | 12* |
| 12.42 | 7.12 | 16 |
| 12.74 | 6.94 | 46 |
| 13.48 | 6.56 | 8* |
| 13.91 | 6.36 | 2* |
| 14.62 | 6.05 | 2* |
| 15.40 | 5.75 | 32* |
| 15.59 | 5.68 | 18 |
| 16.36 | 5.41 | 49 |
| 17.80 | 4.98 | 9 |
| 18.44 | 4.81 | 21 |
| 18.82 | 4.71 | 9 |
| 19.24 | 4.61 | 7 |
| 19.68 | 4.51 | 7* |
| 22.30 | 3.98 | 26* |
| 22.60 | 3.93 | 12 |
| 23.17 | 3.83 | 38* |
| 23.45 | 3.79 | 100 |
| 23.80 | 3.74 | 16* |
| 24.40 | 3.65 | 16 |

TABLE 4-continued

XRD of product as produced in Example 4

| 2 theta | d(Å) | I/I$_o$ |
|---|---|---|
| 24.95 | 3.57 | 53 |
| 25.14 | 3.54 | 22* |
| 25.63 | 3.47 | 94* |
| 26.43 | 3.37 | 16* |
| 26.64 | 3.34 | 12 |
| 22.71 | 3.22 | 9* |
| 28.47 | 3.13 | 51 |
| 29.28 | 3.05 | 19 |
| 30.22 | 2.96 | 9 |
| 31.04 | 2.88 | 6* |
| 31.70 | 2.82 | 7 |

*Lines wholly or partly due to mordenite

TABLE 5(a)

XRD of product produced in Example 5(a)

| 2 theta | d(Å) | I/I$_o$ |
|---|---|---|
| 6.47 | 13.66 | 9* |
| 7.76 | 11.38 | 95 |
| 8.67 | 10.20 | 9* |
| 9.36 | 9.44 | 84 |
| 9.71 | 9.10 | 26* |
| 11.85 | 7.46 | 9 |
| 12.48 | 7.09 | 34 |
| 12.74 | 6.95 | 65 |
| 13.47 | 6.57 | 15* |
| 13.89 | 6.37 | 4* |
| 15.39 | 5.75 | 36* |
| 15.60 | 5.67 | 25 |
| 16.35 | 5.42 | 34 |
| 18.44 | 4.81 | 21 |
| 18.83 | 4.71 | 12 |
| 19.32 | 4.59 | 12* |
| 19.63 | 4.52 | 9* |
| 21.69 | 4.09 | 13 |
| 22.30 | 3.98 | 32* |
| 23.21 | 3.83 | 42* |
| 23.50 | 3.78 | 97 |
| 24.42 | 3.64 | 17 |
| 25.05 | 3.55 | 56 |
| 25.69 | 3.47 | 100* |
| 26.40 | 3.37 | 16* |
| 26.79 | 3.33 | 11 |
| 27.68 | 3.22 | 15* |
| 28.50 | 3.13 | 50 |
| 29.32 | 3.04 | 19 |
| 30.27 | 2.95 | 10 |
| 30.97 | 2.88 | 11* |
| 31.76 | 2.82 | 4 |

*Lines wholly or partly due to mordenite

TABLE 5(b)

XRD of product produced in Example 5(b)

| 2 theta | d(Å) | I/I$_o$ |
|---|---|---|
| 6.50 | 13.59 | 7* |
| 7.78 | 11.35 | 90 |
| 8.72 | 10.13 | 9* |
| 9.38 | 9.42 | 85 |
| 9.75 | 9.07 | 28* |
| 11.83 | 7.47 | 7 |
| 12.47 | 7.09 | 37 |
| 12.75 | 6.94 | 74 |
| 13.50 | 6.55 | 18* |
| 15.42 | 5.74 | 34* |
| 15.61 | 5.67 | 26 |
| 16.38 | 5.41 | 36 |
| 18.45 | 4.81 | 22 |
| 18.83 | 4.71 | 12 |
| 19.35 | 4.58 | 9* |
| 19.61 | 4.52 | 12* |
| 21.67 | 4.10 | 14 |
| 22.37 | 3.97 | 30* |
| 23.20 | 3.83 | 45* |
| 23.51 | 3.78 | 100 |
| 23.78 | 3.74 | 21 |

TABLE 5(b)-continued

XRD of product produced in Example 5(b)

| 2 theta | d(Å) | I/I$_o$ |
|---|---|---|
| 24.42 | 3.64 | 16 |
| 25.06 | 3.55 | 59 |
| 25.68 | 3.47 | 95* |
| 26.43 | 3.37 | 20* |
| 26.80 | 3.32 | 11 |
| 27.67 | 3.22 | 17* |
| 28.51 | 3.13 | 54 |
| 29.33 | 3.04 | 20 |
| 30.31 | 2.95 | 12 |
| 30.96 | 2.89 | 9* |
| 31.78 | 2.81 | 7 |

*Lines wholly or partly due to mordenite

TABLE 6

XRD of product produced in Example 6

| 2 theta | d(Å) | I/I$_o$ |
|---|---|---|
| 6.51 | 13.57 | 14* |
| 7.75 | 11.40 | 47 |
| 8.65 | 10.22 | 4* |
| 9.36 | 9.44 | 53 |
| 9.76 | 9.06 | 26* |
| 12.40 | 7.13 | 17 |
| 12.71 | 6.96 | 38 |
| 13.48 | 6.56 | 18* |
| 14.66 | 6.04 | 3* |
| 15.38 | 5.76 | 36* |
| 15.53 | 5.70 | 17 |
| 16.32 | 5.43 | 48 |
| 17.76 | 4.99 | 9 |
| 18.40 | 4.82 | 20 |
| 18.80 | 4.72 | 9 |
| 19.20 | 4.62 | 8 |
| 19.63 | 4.52 | 14* |
| 20.80 | 4.27 | 15** |
| 21.44 | 4.14 | 2 |
| 22.26 | 3.99 | 30* |
| 22.56 | 3.94 | 10 |
| 23.13 | 3.84 | 37 |
| 23.43 | 3.79 | 97 |
| 23.75 | 3.74 | 15* |
| 24.37 | 3.65 | 15 |
| 24.93 | 3.57 | 49 |
| 25.60 | 3.48 | 86* |
| 26.58 | 3.35 | 100** |
| 27.70 | 3.22 | 15* |
| 28.43 | 3.14 | 48 |
| 29.24 | 3.05 | 16 |
| 30.22 | 2.96 | 8 |
| 31.02 | 2.88 | 8* |
| 31.69 | 2.82 | 6 |

*Lines wholly or partly due to mordenite
**Lines wholly or partly due to quartz

TABLE 7

XRD of product produced in Example 7

| 2 theta | d(Å) | I/I$_o$ |
|---|---|---|
| 6.56 | 13.46 | 13* |
| 7.75 | 11.41 | 100 |
| 8.84 | 10.00 | 22* |
| 9.34 | 9.46 | 87 |
| 9.76 | 9.06 | 29* |
| 12.43 | 7.12 | 36 |
| 12.72 | 6.95 | 71 |
| 13.58 | 6.52 | 15* |
| 15.38 | 5.76 | 30 |
| 15.57 | 5.69 | 26 |
| 16.33 | 5.42 | 40 |
| 18.42 | 4.81 | 21 |
| 18.78 | 4.72 | 9 |
| 19.33 | 4.59 | 9 |
| 19.71 | 4.50 | 84* |
| 22.33 | 3.98 | 11* |
| 22.60 | 3.93 | 11 |
| 23.17 | 3.84 | 32* |

TABLE 7-continued

| XRD of product produced in Example 7 | | |
|---|---|---|
| 2 theta | d(Å) | I/I$_o$ |
| 23.50 | 3.78 | 80 |
| 23.82 | 3.73 | 15 |
| 24.42 | 3.64 | 11 |
| 25.06 | 3.55 | 48 |
| 25.66 | 3.47 | 66* |
| 26.47 | 3.36 | 13* |
| 26.80 | 3.32 | 10 |
| 28.47 | 3.13 | 44* |
| 29.29 | 3.05 | 16 |
| 30.25 | 2.96 | 8 |
| 31.12 | 2.87 | 7* |
| 31.78 | 2.81 | 5 |

*Lines wholly or partly due to mordenite

I claim:

1. A crystalline material having, in the dehydrated form, the empirical formula:

$$m(M_{2/a}O):X_zO_{xz/2}:yYO_2 \qquad (I)$$

in which m is 0.5 to 1.5; M is a cation of valency a; X is a metal of valency x, selected from aluminium, boron, gallium, zinc, iron and titanium; z is 2 when x is an odd number, and z is 1 when x is an even number; y is at least 5; and Y is silicon or germanium; and having, in the calcined hydrogen form, an X-ray diffraction pattern including the following significant peaks:

| d(Å) | I |
|---|---|
| 11.4 ± 0.3 | S |
| 9.5 ± 0.3 | S |
| 7.1 ± 0.2 | W/M |
| 7.0 ± 0.2 | S |
| 5.8 ± 0.15 | M |
| 5.4 ± 0.15 | S |
| 4.8 ± 0.1 | M |
| 4.0 ± 0.1 | M/S |
| 3.8 ± 0.1 | VS |
| 3.6 ± 0.1 | S |
| 3.5 ± 0.1 | M |
| 3.1 ± 0.1 | S |
| 3.05 ± 0.1 | W | wherein VS=60-140, S=40-60, M-20-40, W=0.20.

2. A material as claimed in claim 1, in which X is aluminium.

3. A material as claimed in claim 1, in which Y is silicon.

4. A material as claimed in claim 1, in the calcined hydrogen form.

5. A process for the preparation of a material as claimed in claim 1 which comprises reacting together under aqueous alkaline conditions a source of oxide YO$_2$; water, quinuclidine or its precursor or reaction product; and tetraethylammonium hydroxide or halide or its precursor or reaction product; and optionally, a source of oxide X$_z$O$_{xz/2}$ and a source of M(OH)a; the reaction conditions being selected and maintained such as to produce a crystalline material having, in the dehydrated form, the empirical formula:

$$m(M_{2/a}O):X_zO_{xz/2}:yYO_2 \qquad (I)$$

in which m is 0.5 to 1.5; M is a cation of valency a; X is a metal of valency x, selected from aluminium, boron, gallium, zinc, iron and titanium; z is 2 when x is an odd number, and z is 1 when x is an even number; y is at least 5; and Y is silicon or germanium; and having, in the calcined hydrogen form, an X-ray diffraction pattern including the following significant peaks:

| d(Å) | I |
|---|---|
| 11.4 ± 0.3 | S |
| 9.5 ± 0.3 | S |
| 7.1 ± 0.2 | W/M |
| 7.0 ± 0.2 | S |
| 5.8 ± 0.15 | M |
| 5.4 ± 0.15 | S |
| 4.8 ± 0.1 | M |
| 4.0 ± 0.1 | M/S |
| 3.8 ± 0.1 | VS |
| 3.6 ± 0.1 | S |
| 3.5 ± 0.1 | M |
| 3.1 ± 0.1 | S |
| 3.05 ± 0.1 | W | wherein VS=60-140, S=40-60, M-20-40, W=0.20.

6. A process as claimed in claim 5, in which the reaction mixture has components in the following molar ratios:
YO$_2$/X$_2$O$_{xz/2}$=at least 10; quinuclidine or derivative/tetraethylammonium compound=0.1 to 3.0; H$_2$O/YO$_2$=4 to 500; OH$^-$/H$_2$O=less than 0.04; quinuclidene or derivative plus tetraethylammonium compound/YO$_2$=0.01 to 2.0.

7. A process as claimed in claim 6, in which the reaction mixture has components in the following molar ratios:
YO$_2$/X$_2$O$_{xz/2}$=10 to 80; quinuclidine or derivative/tetraethylammonium compound=0.5 to 2.0; H$_2$O/YO$_2$=5 to 200; OH$^-$/H$_2$O=less than 0.02; quinuclidine or derivative plus tetraethylammonium compound/YO$_2$=0.01 to 1.0.

8. A process as claimed in claim 5, in which the reaction mixture also includes methanol.

* * * * *